US009897107B2

(12) United States Patent
An et al.

(10) Patent No.: US 9,897,107 B2
(45) Date of Patent: Feb. 20, 2018

(54) COMPRESSOR WHEEL AND UNBALANCE DETECTION DEVICE FOR COMPRESSOR ASSEMBLY

(71) Applicant: MITSUBISHI HEAVY INDUSTRIES, LTD., Tokyo (JP)

(72) Inventors: Byeongil An, Tokyo (JP); Junichi Yoshida, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 276 days.

(21) Appl. No.: 14/759,566

(22) PCT Filed: Feb. 22, 2013

(86) PCT No.: PCT/JP2013/054562
§ 371 (c)(1),
(2) Date: Jul. 7, 2015

(87) PCT Pub. No.: WO2014/128927
PCT Pub. Date: Aug. 28, 2014

(65) Prior Publication Data
US 2015/0361993 A1    Dec. 17, 2015

(51) Int. Cl.
F04D 29/26    (2006.01)
F04D 29/66    (2006.01)
(Continued)

(52) U.S. Cl.
CPC .......... *F04D 29/662* (2013.01); *F01D 5/027* (2013.01); *F01D 25/285* (2013.01); *F02B 39/10* (2013.01);
(Continued)

(58) Field of Classification Search
CPC ...... F01D 5/027; F04D 29/284; F04D 29/662; F05D 2260/96; G01M 1/22
See application file for complete search history.

(56) References Cited

U.S. PATENT DOCUMENTS 3,811,327 A * 5/1974 Hack ............... G01M 1/22
73/465
5,353,640 A * 10/1994 Jiang ............... G01M 1/06
73/460

(Continued)

FOREIGN PATENT DOCUMENTS

CN    102341579 A    2/2012
JP    61-104349 U    7/1986
(Continued)

OTHER PUBLICATIONS

Extended European Search Report dated Dec. 10, 2015 issued in the corresponding EP Application No. 13875952.7.
(Continued)

*Primary Examiner* — Ninh H Nguyen
(74) *Attorney, Agent, or Firm* — Birch, Stewart, Kolasch & Birch, LLP

(57) ABSTRACT

A compressor wheel that can more effectively and accurately detect its rotational unbalance than before is provided. The compressor wheel is disposed in a compressor assembly, the compressor wheel including a boss portion mounted on a rotation shaft, a rear plate portion disposed on an opposite side of a tip end portion disposed on one end side of the boss portion, the rear plate portion extending perpendicular to an axial direction of the rotation shaft, and a sensor detection surface formed on a circumferential surface of the tip end portion of the boss portion or on a circumferential surface of the rear plate portion, the sensor detection surface being inclined to the circumferential surface of the end portion or the circumferential surface of the rear plate portion, the sensor detection surface being detectable by an optical sensor that irradiates the sensor detection surface with light and detects light reflected therefrom.

16 Claims, 11 Drawing Sheets

(51) Int. Cl.
- *F01D 5/02* (2006.01)
- *F01D 25/28* (2006.01)
- *F04D 29/28* (2006.01)
- *G01M 1/22* (2006.01)
- *F02B 39/10* (2006.01)
- *F04D 17/10* (2006.01)
- *F04D 25/06* (2006.01)
- *F02B 39/16* (2006.01)

(52) U.S. Cl.
CPC .............. *F04D 17/10* (2013.01); *F04D 25/06* (2013.01); *F04D 29/284* (2013.01); *G01M 1/22* (2013.01); *F02B 39/16* (2013.01); *F05D 2220/40* (2013.01); *F05D 2260/96* (2013.01)

(56) References Cited

U.S. PATENT DOCUMENTS

| | | | | |
|---|---|---|---|---|
| 5,871,314 | A | * | 2/1999 | Trionfetti ................ G01M 1/34 409/162 |
| 2012/0003093 | A1 | | 1/2012 | Lischer et al. |

FOREIGN PATENT DOCUMENTS

| | | |
|---|---|---|
| JP | 3-23320 A | 1/1991 |
| JP | 4-315936 A | 1/1991 |
| JP | 10-299501 A | 11/1998 |
| JP | 2003-302304 A | 10/2003 |
| JP | 2006-214884 A | 8/2006 |
| JP | 2007-192172 A | 8/2007 |
| JP | 2008-58008 A | 3/2008 |
| JP | 2010-96036 A | 4/2010 |
| JP | 2010-275878 A | 12/2010 |
| JP | 4618142 B2 | 1/2011 |
| JP | 4662155 B2 | 3/2011 |
| JP | 4710736 B2 | 6/2011 |
| JP | 4807185 B2 | 11/2011 |

OTHER PUBLICATIONS

International Preliminary Report on Patentability and English translation of the Written Opinion of the International Searching Authority (forms PCT/IB/373, PCT/ISA/237, PCT/IB/338 and PCT/IB/326), dated Sep. 3, 2015, for International Application No. PCT/JP2013/054562.

International Search Report and Written Opinion of the International Searching Authority (forms PCT/ISA/210, PCT/ISA/237 and PCT/ISA/220), dated Apr. 16, 2013, for International Application No. PCT/JP2013/054562.

Japanese Office Action, dated Jun. 27, 2014, for Japanese Application No. 2014-501357, along with an English translation.

Office Action dated Jan. 11, 2007 issued in the corresponding Chinese Application No. 201380066536.7.

* cited by examiner

COMPRESSOR WHEEL AND UNBALANCE DETECTION DEVICE FOR COMPRESSOR ASSEMBLY

TECHNICAL FIELD

The present invention relates to a compressor wheel with which an electric supercharger driven by an electric motor such as a high speed motor is provided and to a rotational unbalance detection device for a compressor assembly.

BACKGROUND

To improve the performance of an internal combustion engine, a supercharger (also referred to as a turbocharger) that drives with an exhaust gas of an internal combustion engine, compresses intake air, and threes compressed intake air to the internal combustion engine is used. An electric supercharger that uses an electric motor as a drive source instead of a turbine has become common. In the electric supercharger, the electric motor is disposed at a shaft of the electric supercharger. The electric motor rotationally drives a compressor so as to improve acceleration responsiveness of the electric supercharger. The rotation shaft of the electric supercharger is provided with a rotor made of a permanent magnet, an iron core, or the like.

Even if the rotational balance of each structural member that composes a rotor of a compressor wheel or the like of the electric supercharger is accurately adjusted, the rotational unbalance of the whole assembly of the individual structural members may be lost due to an assembling error or the like. If the unbalanced rotor is rotated at a high speed, the rotor may vibrate or break. Thus, before the electric supercharger is shipped, the rotor is rotated so as to contactlessly accurately measure the rotational unbalance of the rotor. A circumferential portion of the rotor that causes the rotational balance of the rotor to be lost is machined by shaving based on the measured result so as to correct the rotational unbalance of the rotor. Patent Document 1 discloses a related art reference that contactlessly measures a position and an amount of a portion where a rotational unbalance occurs in a rotor. In the method disclosed in Patent Document 1, a magnetized nut is mounted on a part of the rotor. Reference direction and position are detected by the magnetized nut. In addition, rotational unbalance portions and rotational unbalance amounts of the rotor are measured based on the reference direction and position.

CITATION LIST

Patent Literature

Patent Document 1: Japanese Patent Application Laid-Open No. 2008-58008

SUMMARY

Technical Problem

When the rotational unbalance of a cartridge type assembly of a conventional turbo or an assist turbo is corrected, a mark that represents reference direction and position is placed on the turbine side so as to obtain the unbalance direction. However, since an electric compressor does not have a turbine, it is necessary to place a mark on a compressor wheel. When the rotational unbalance of the compressor wheel is corrected, a mark that represents the reference direction and position is used. Since the mark is normally placed on the rear surface side of the compressor, it is difficult to apply the mark in the case that the rational unbalance of the cartridge type assembly is corrected.

Although the rotational unbalance correction method disclosed in Patent Document 1 can contactlessly detect rotational unbalance positions and rotational unbalance amounts of the compressor wheel, since the magnetized nut that is detected is expensive, after the rotational unbalance of the compressor wheel is corrected, the magnetized nut is removed and reused. As a result, the number of production steps adversely increases. In addition, unless the magnetized nut is frequently calibrated, after the magnetized nut is removed, the unbalance component of the magnetized nut itself is removed. As a result, the compressor wheel becomes unbalanced.

The present invention is made to solve the foregoing problem. An object of the present invention is to provide a new and improved compressor wheel and a rotational unbalance detection device for a compressor assembly that can more effectively and accurately detect its rotational unbalance than the conventional structures.

Solution to Problem

An aspect of the present invention is a compressor wheel disposed in a compressor assembly, the compressor wheel including a boss portion mounted on a rotation shaft;

a rear plate portion disposed on an opposite side of a tip end portion disposed on one end side of the boss portion, the rear plate portion extending perpendicular to an axial direction of the rotation shaft, and a sensor detection surface formed on a circumferential surface of the tip end portion of the boss portion or on a circumferential surface of the rear plate portion, the sensor detection surface being inclined to the circumferential surface of the end portion or the circumferential surface of the rear plate portion, the sensor detection surface being detectable by an optical sensor that irradiates the sensor detection surface with light and detects light reflected therefrom.

According to an aspect of the present invention, since the sensor detection surface is inclined to the circumferential surface of the boss portion or the rear plate portion, only when the sensor detection surface passes through the front of the optical sensor, the optical sensor can accurately detect the reference direction and position of the compressor wheel.

According to an aspect of the present invention, a balance cut portion may be disposed on the tip end portion of the boss portion, the balance cut portion being a part of the circumferential surface that is cut. The sensor detection surface may be formed closer to the rear plate portion than a region where the balance cut portion is disposed and closer to the tip end portion than a rear surface of the rear plate portion.

Thus, when the rotational unbalance of the compressor wheel is corrected, the sensor detection surface is not cut. As a result, since the sensor detection surface is not affected by the balance cut amount, the reference direction and position of the compressor wheel can be accurately detected.

According to an aspect of the present invention, the sensor detection surface may be a bottom surface of a hole portion formed in the boss portion so that the sensor detection surface is inclined to the circumferential surface of the boss portion.

Thus, since the hole portion is inclined to the circumferential surface of the boss portion, only when the sensor detection surface passes through the front of the optical sensor, the optical sensor detects reflected light. As a result, the optical sensor can accurately detect the reference direction and position.

According to an aspect of the present invention, the tip end portion may include a first tip end portion on which the balance cut portion is disposed and a second tip end portion formed on a base end side of the first tip end portion, the second tip end portion having an outer diameter greater than the first tip end portion. The sensor detection surface may be a slope surface of a cut portion formed on a vertex side of the circumferential surface of the second tip end portion, the sensor detection surface being inclined to the circumferential surface of the second tip end portion.

Thus, since the tip end portion is formed of step portions of a first tip end portion and a second tip end portion, the sensor detection surface can be more easily machined.

According to an aspect of the present invention, the sensor detection surface may be a slope surface of a cut portion formed on a vertex side of the circumferential surface of the rear plate portion, the sensor detection surface being inclined to the circumferential surface of the rear plate portion.

Thus, since the sensor detection surface is a slope surface of a cut portion formed on a vertex side of the circumferential surface of the rear plate portion, only when the sensor detection surface passes through the front of the optical sensor, the optical sensor detects reflected light. As a result, the optical sensor can accurately detect the reference direction and position of the compressor wheel.

According to an aspect of the present invention, a balance cut portion may be disposed on the circumferential surface of the rear plate portion, the balance cut portion being a part of the circumferential surface that is vertically cut. The sensor detection surface may be disposed on a vertex side of the circumferential surface of the rear plate portion so that the sensor detection surface does not interfere with the balance cut portion.

Thus, since the sensor detection surface is a slope surface of a cut portion formed on a vertex side of the circumferential surface of the rear plate portion, only when the sensor detection surface passes through the front of the optical sensor, the optical sensor detects reflected light. As a result, the optical sensor can accurately detect the reference direction and position of the compressor wheel. In addition, when the rotational unbalance of the compressor wheel is corrected, the sensor detection surface is not cut.

According to an aspect of the present invention, the sensor detection surface may be a slope surface of a cut portion formed on the circumferential surface of the boss portion, the slope surface being inclined to the circumferential surface.

Thus, since the sensor detection surface is a slope surface of a cut portion formed on the circumferential surface of the boss portion, only when the sensor detection surface passes through the front of the optical sensor, the optical sensor detects reflected light. As a result, the optical sensor can accurately detect the reference direction and position of the compressor wheel.

According to an aspect of the present invention, a balance cut portion may be disposed on the tip end portion of the boss portion, the balance cut portion being a part of the circumferential surface that is vertically cut. The sensor detection surface may be a bottom surface of a hole portion formed in a region where the balance cut portion is disposed, the sensor detection surface being inclined to the cut surface of the balance cut portion, the bottom surface being closer to a rotation axis side of the compressor wheel than a maximum cut range of the balance cut portion.

Thus, since the length of the tip end portion of the boss portion can be prevented from increasing, the compressor wheel can be compacted. In addition, when the rotational unbalance of the compressor wheel is corrected, the sensor detection surface is not cut. As a result, the reference direction and position of the compressor wheel can be accurately detected without influence of the amount of balance cut.

Another aspect of the present invention is a rotational unbalance detection device for a compressor assembly in which the foregoing compressor wheel is disposed, the rotational unbalance detection device including a rotation portion configured to rotate the compressor wheel, and a detection portion having an optical sensor that detects a sensor detection surface formed on the compressor wheel.

According to another aspect of the present invention, when the rotational unbalance of the foregoing compressor wheel is measured, the reference direction and position of the compressor wheel can be accurately detected.

According to another aspect of the present invention, the rotation portion may be an air supply unit that supplies air to compressor blades disposed on the compressor wheel.

Thus, the rotational unbalance of the compressor assembly from which a motor and an inverter are disconnected can be easily corrected. As a result, the rotational unbalance detection device can be simply structured and compacted.

According to another aspect of the present invention, the air supply unit may supply the air from a downstream side of the compressor wheel to an upstream side thereof.

Thus, when the rotational unbalance of the compressor assembly is detected, the compressor wheel can be effectively rotated.

According to another aspect of the present invention, the air supply unit may supply the air from an upstream side of the compressor wheel to a downstream side thereof.

Thus, the rotational unbalance of the compressor wheel can be accurately measured.

According to another aspect of the present invention, the rotation portion may be a motor that rotationally drives a rotation shaft disposed in the compressor assembly.

Thus, since the rotational unbalance of the compressor wheel due to magnetic suction of the motor is corrected, the quality of the final product can be more improved than the conventional structures.

According to another aspect of the present invention, an open portion may be formed on another end portion of the compressor assembly, the other end portion being opposite to one end portion thereof on which the compressor wheel is disposed.

Thus, since a nut or the like is shaved from the rear end side of the compressor assembly, the rotational unbalance of the compressor assembly can be corrected.

Advantageous Effects

As described above, according to the present invention, the rotational unbalance of the compressor wheel can be more accurately detected than the conventional structures.

DETAILED DESCRIPTION

Next, preferable embodiments of the present invention will be described. The embodiments that will be described in the following do not limit the subject of the present invention described in the scope of claims. In addition, all structures described in the embodiments are not always necessary for solving means of the present invention.

(First Embodiment)

Figure 1A:
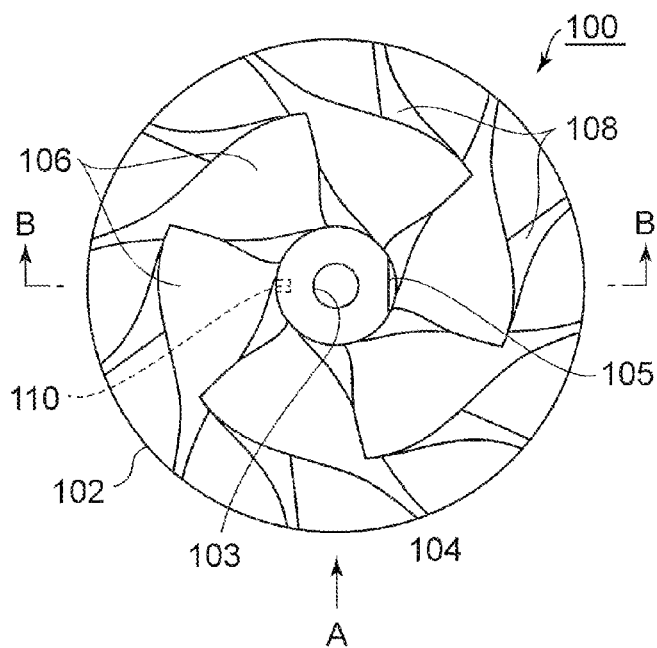
FIG. 1A is a plan view illustrating a compressor wheel according to a first embodiment of the present invention, FIG. 1B being a view on arrow A of FIG. 1A, FIG. 1C being a sectional view taken along line B-B of FIG. 1A.
Figure 1B:
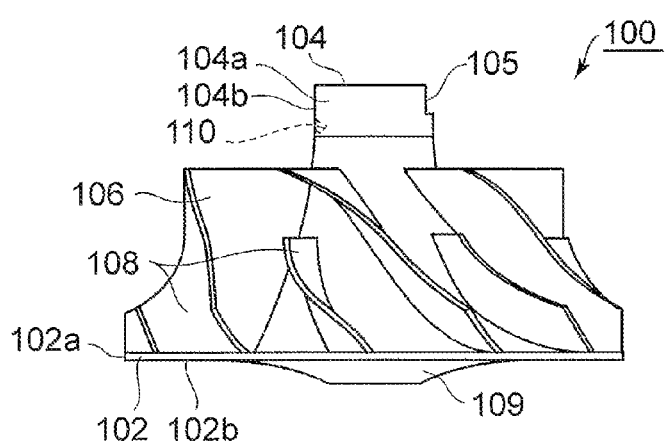
Figure 1C:
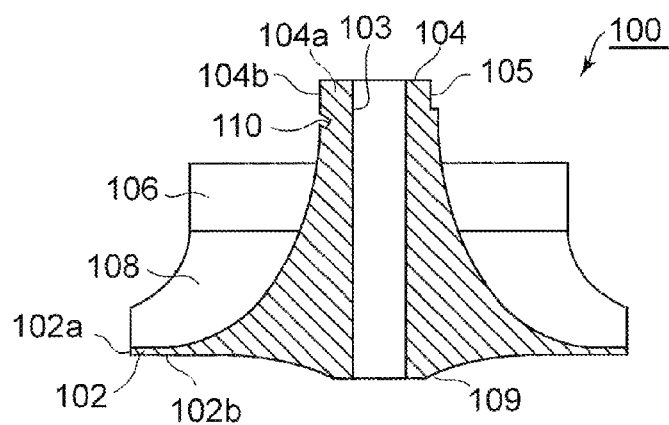
Figure 2A:
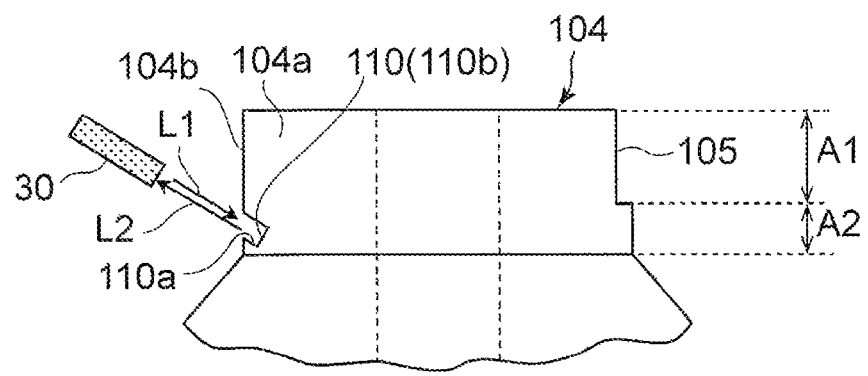
FIGS. 2A and 2B are schematic diagrams describing a detection operation that an optical sensor detects a sensor detection surface of the compressor wheel according to the embodiment.
Figure 2B:
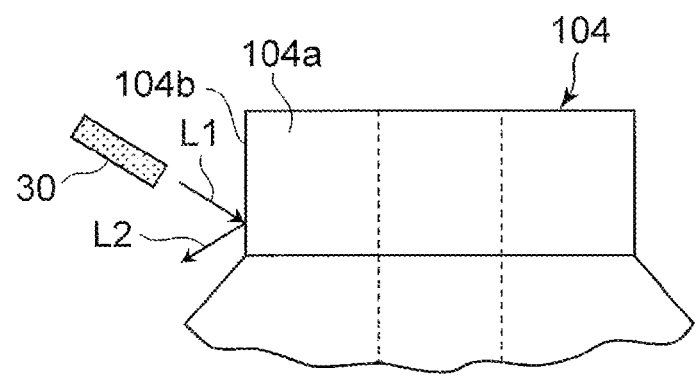

First, with reference to accompanying drawings, a compressor wheel according to a first embodiment of the present invention will be described. FIGS. 1A to 1C are schematic diagrams illustrating an outlined structure of the compressor wheel according to the first embodiment of the present invention, FIG. 1A being a plan view illustrating the compressor wheel according to the present embodiment, FIG. 1B being a view on arrow A of FIG. 1A, FIG. 1C being a sectional view taken along line B-B of FIG. 1A. FIGS. 2A and 2B are schematic diagrams describing a detection operation that an optical sensor detects a sensor detection surface of the compressor wheel according to the present embodiment.

A compressor wheel 100 according to the present embodiment is made of a light alloy such as aluminum, magnesium, or titanium that is machined by casting, forging, shaving, or the like. As illustrated in FIGS. 1A to 1C, the compressor wheel 100 includes a disc-shaped rear plate portion 102, a boss portion 104 integrated with and disposed perpendicular to the rear plate portion 102, compressor blades 106 and 108 integrated with and disposed between the boss portion 104 and the rear plate portion 102, and a sensor detection portion 110. According to the present embodiment, a balance cut portion 105 is a part of a circumferential surface 104b of the tip end portion 104a of the boss portion 104. When the rotational unbalance of the compressor wheel is corrected, the balance cut portion 105 is cut. The rear plate portion 102 is disposed on an opposite side of the tip end portion 104a disposed on one end side of the boss portion 104. The rear plate portion 102 extends in a vertical direction of a rotation shaft 52 (refer to FIG. 8) mounted on the boss portion 104, the vertical direction having an error of around ±5°.

As illustrated in FIG. 1A, the compressor blades include six long blades 106 and six short blades 108 arranged alternately. As illustrated in FIGS. 1A and 1C, a circular through-hole 103 is formed in the boss portion 104 and the rear plate portion 102. In addition, as illustrated in FIG. 1B, a thick portion 109 is disposed on a rear side of the rear plate portion 102 as a base of the boss portion 104, a stress concentrating at the base. The number of the compressor blades 106 and 108 is not limited to the foregoing number. Such a thick portion may not be disposed on the rear side of the rear plate portion 102.

According to the present embodiment, the sensor detection surface 110 that an optical sensor detects with reflected light of irradiation light is disposed on the circumferential surface 104b of the tip end portion 104a of the boss portion 104 so that the sensor detection surface 110 is inclined to the circumferential surface 104b. In other words, as illustrated in FIG. 2A, a bottom surface 110b of a hole portion 110a is formed in the boss portion 104b so that the bottom surface 110b is inclined to the circumferential surface 104b. The bottom surface 110b becomes the sensor detection surface 110. Thus, according to the present embodiment, the sensor detection surface 110 is vertically inclined to the circumferential surface 104b.

In addition, according to the present embodiment, the sensor detection surface 110 is formed in a region A2 closer to the rear plate side than a region A1 on which the balance cut portion 105 is disposed. In other words, the hole portion 110a that becomes the sensor detection surface 110 that the optical sensor detects with light is formed between the balance cut portion 105 of the tip end portion 104a of the boss portion 104 that becomes a nut tightening portion of the compressor wheel 100 and the compressor blades 106 and 108.

To maintain the rigidity of the compressor wheel 100, the sensor detection surface 110 is desirably as small as possible. The sensor detection surface 110 has a width enough to allow an optical sensor 30 to detect the sensor detection surface 110, for example approximately 0.5 mm to approximately 1.5 mm, desirably approximately 1 mm. The sensor detection surface 110 has an inclined angle enough to allow the optical sensor 30 to distinguish and detect the sensor detection surface 110 from the circumferential surface 104b of the tip end portion 104a of the boss portion 104 and the balance cut portion 105 that is shaved and machined to correct the rotational unbalance of the compressor wheel 100, for example approximately 30° to approximately 60°, desirably approximately 45°.

The optical sensor 30 detects the sensor detection surface 110 with reflected light L2 of irradiation light L1 with which the optical sensor 30 irradiates the sensor detection surface 110. The optical sensor 30 is a fiber sensor or the like that coaxially exits and enters light. As illustrated in FIG. 2A, the optical sensor 30 is inclined by approximately 45° to an axial direction of the boss portion 104. In other words, the optical sensor 30 is nearly perpendicular to the sensor detection surface 100, namely the bottom surface 110*b* of the hole portion 110*a*. In addition, the optical sensor 30 is inclined by approximately 45° to a circumferential surface 102*a* and a rear surface 102*b* of the rear plate portion 102 of the compressor wheel 100.

As a result, the irradiation light L1 of the optical sensor 30 is regularly reflected on the sensor detection surface 110. The reflected light L2 enters the optical sensor 30. In other words, the optical sensor 30 detects the sensor detection surface 110 with the reflected light L2 of the irradiation light L1 with which the optical sensor 30 irradiates the sensor detection surface 110. On the other hand, when a region where the sensor detection surface 110 is not formed on the circumferential surface 104*b* of the boss portion 104 is irradiated with the irradiation light L1, as illustrated in FIG. 2B, since the irradiation light L1 is reflected at approximately 45° from this region of the circumferential surface 104*b*, the reflected light L2 does not enter the optical sensor 30.

Thus, according to the present embodiment, the hole portion 110*a* is formed in the boss portion 104 so that the hole portion is inclined to the circumferential surface 104*b*. As a result, when the rotational unbalance of the compressor wheel 100 is detected and corrected, the optical sensor 30 detects the reflected light L2 only when the sensor detection surface 110 of the compressor wheel 100 passes through the front of the optical sensor 30. Consequently, when the rotational unbalance of a compressor assembly 50 (refer to FIG. 8) on which the compressor wheel 100 is disposed is corrected, the sensor detection surface 110 that becomes the reference direction and position in which a rotational unbalance position and a rotational unbalance amount of the compressor wheel 100 are contactlessly measured can be accurately detected.

(Second Embodiment)

Figure 3A:
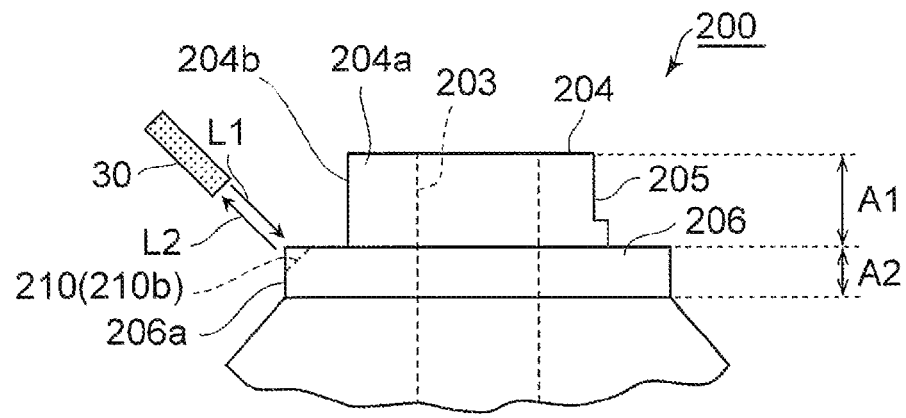
FIGS. 3A and 3B are schematic diagrams describing a structure of a sensor detection surface of a compressor wheel according to a second embodiment of the present invention and a detection operation that an optical sensor detects a sensor detection surface.
Figure 3B:
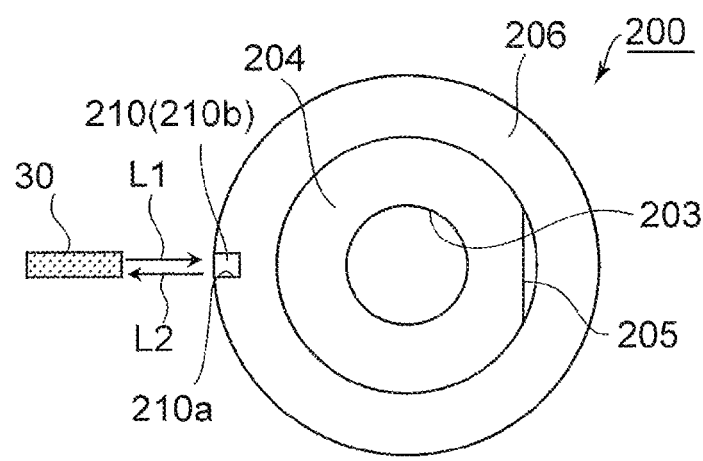

Next, with reference to accompanying drawings, a compressor wheel according to a second embodiment of the present invention will be described. FIGS. 3A and 3B are schematic diagrams describing a structure of a sensor detection surface of the compressor wheel according to the second embodiment of the present invention and a detection operation that an optical sensor detects the sensor detection surface.

According to the present embodiment, as illustrated in FIG. 3A, a tip end portion of a boss portion 204 has a first tip end portion 204*a*, on which a balance cut portion 205 is disposed, and a second tip end portion 206, disposed on a base end portion side of the first tip end portion 204*a*, the second tip end portion 206 having an outer diameter greater than the first tip end portion 204*a*. As illustrated in FIGS. 3A and 3B, a slope surface 210*b* of a cut portion 210*a* is formed on a vertex side of a circumferential surface 206*a* of the second tip end portion 206 so that the slope surface 210*b* is inclined to the circumferential surface 206*a*. The slope surface 210*b* becomes a sensor detection surface 210. In other words, according to the present embodiment, the sensor detection surface 210 is vertically inclined to the circumferential surface 206*a* of the second tip end portion 206. Since the other structural elements of the compressor wheel 200 according to the present embodiment are the same as those according to the first embodiment, their description will be omitted.

Like the first embodiment, according to the present embodiment, the sensor detection surface 210 is disposed on a region A2 closer to a rear plate portion side than a region A1 on which the balance cut portion 205 is disposed. In other words, the slope surface 210*b* that becomes the sensor detection surface 210 is formed between the balance cut portion 205 of the first tip end portion 204*a* of the boss portion 204 that becomes a nut tightening portion of the compressor wheel 200 and the compressor blades 106 and 108 (refer to FIGS. 1A to 1C).

To maintain the rigidity of the compressor wheel 200, the sensor detection surface 210 is desirably as small as possible. The sensor detection surface 210 has a width enough to allow an optical sensor 30 to detect the sensor detection surface 210, for example approximately 0.5 mm to approximately 1.5 mm, desirably approximately 1 mm. The sensor detection surface 210 has an inclined angle enough to allow the optical sensor 30 to distinguish and detect the sensor detection surface 210 from the circumferential surface 204*b* of the first tip end portion 204*a* of the boss portion 204, the circumferential surface 206*a* of the second tip end portion 206, and the balance cut portion 205 that is shaved and machined to correct the rotational unbalance of the compressor wheel 200, for example approximately 30° to approximately 60°, desirably approximately 45°.

The optical sensor 30 detects the sensor detection surface 210 with reflected light L2 of irradiation light L1 with which the optical sensor 30 irradiates the sensor detection surface 210. The optical sensor 30 is a fiber sensor or the like that coaxially exits and enters light. As illustrated in FIG. 3A, the optical sensor 30 is inclined by approximately 45° to an axial direction of the boss portion 204. In other words, the optical sensor 30 is nearly perpendicular to the sensor detection surface 210, namely the slope surface 210*b* of the cut portion 210*a*. In addition, the optical sensor 30 is inclined by approximately 45° to a circumferential surface and a rear surface of the rear plate portion 202 of the compressor wheel 200.

As a result, the irradiation light L1 of the optical sensor 30 is regularly reflected on the sensor detection surface 210. The reflected light L2 enters the optical sensor 30. In other words, the optical sensor 30 detects the sensor detection surface 210 with the reflected light L2 of the irradiation light L1 with which the optical sensor 30 irradiates the sensor detection surface 210. On the other hand, when a region where the sensor detection surface 210 is not formed on the second tip end portion 206 of the boss portion 204 is irradiated with the irradiation light L1, since the irradiation light L1 is reflected at approximately 45° from this region, the reflected light L2 does not enter the optical sensor 30.

According to the present embodiment, the cut portion 210*a* is inclined to the circumferential surface 206*a* of the second tip end portion 206. When the rotational unbalance of the compressor wheel 200 is detected and corrected, the optical sensor 30 detects the reflected light L2 only when the sensor detection surface 210 of the compressor wheel 200 passes through the front of the optical sensor 30. Thus, when the rotational unbalance of the compressor assembly 50 (refer to FIG. 8) on which the compressor wheel 200 is disposed is corrected, the sensor detection surface 210 that becomes the reference direction and position in which a rotational unbalance position and a rotational unbalance amount of the compressor wheel 200 are contactlessly measured can be accurately detected. In addition, according to the present embodiment, when the tip end portion of the boss portion 204 is formed of step portions of the first tip end portion 204a and the second tip end portion 206, the sensor detection surface 210 can be more easily machined than the other structures.

(Third Embodiment)

Figure 4A:
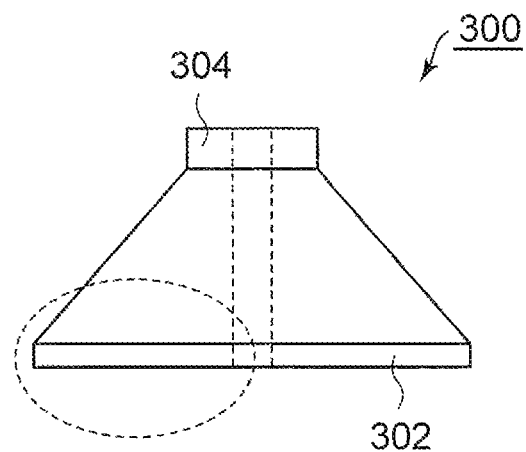
FIGS. 4A and 4B are schematic diagrams describing a structure of a sensor detection surface of a compressor wheel according to a third embodiment of the present invention and a detection operation that an optical sensor detects a sensor detection surface.
Figure 4B:
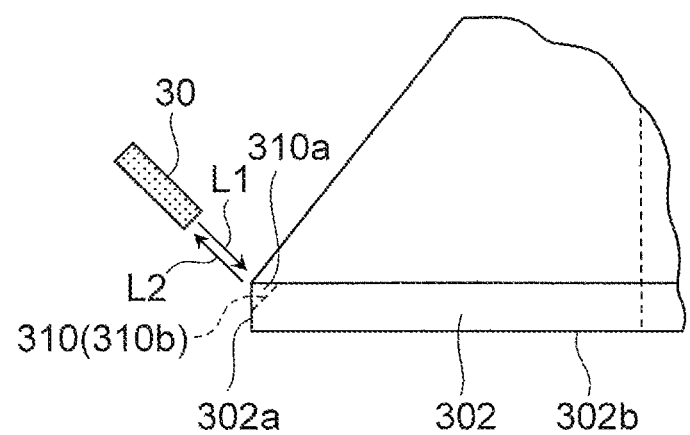
Figure 5A:
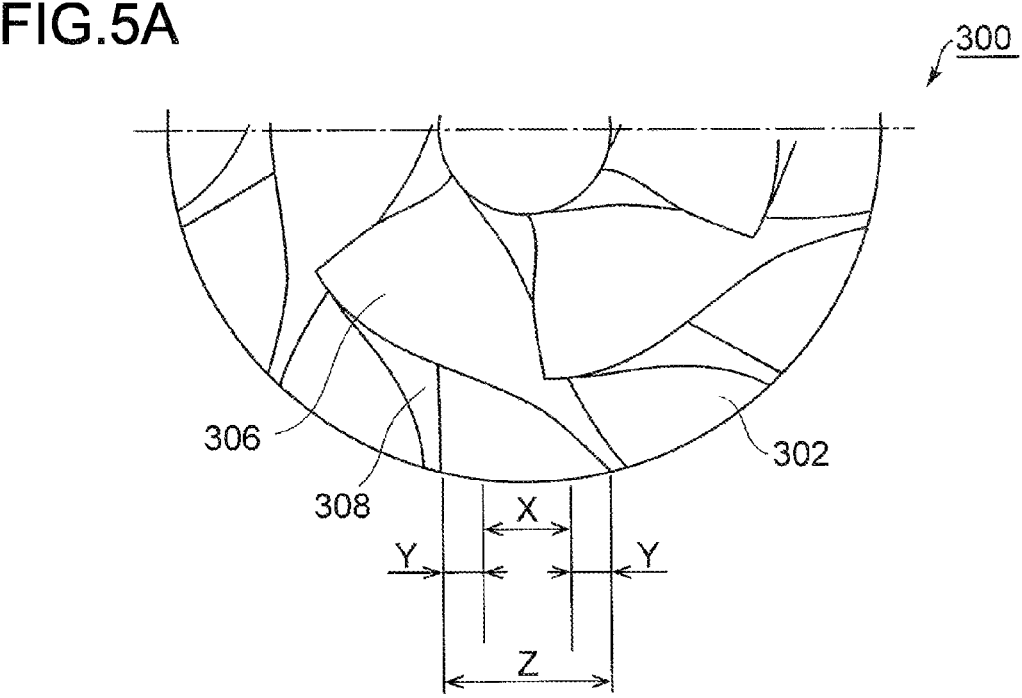
FIGS. 5A and 5B are schematic diagrams describing a portion where the sensor detection surface of the compressor wheel according to the third embodiment of the present invention is formed.

Next, with reference to accompanying drawings, a compressor wheel according to a third embodiment of the present invention will be described. FIGS. 4A and 4B are schematic diagrams describing a structure of a sensor detection surface of the compressor wheel according to the third embodiment of the present invention and a detection operation that an optical sensor detects the sensor detection surface. FIGS. 5A and B are schematic diagrams describing members that form the sensor detection surface of the compressor wheel according to the third embodiment of the present invention.

Figure 5B:
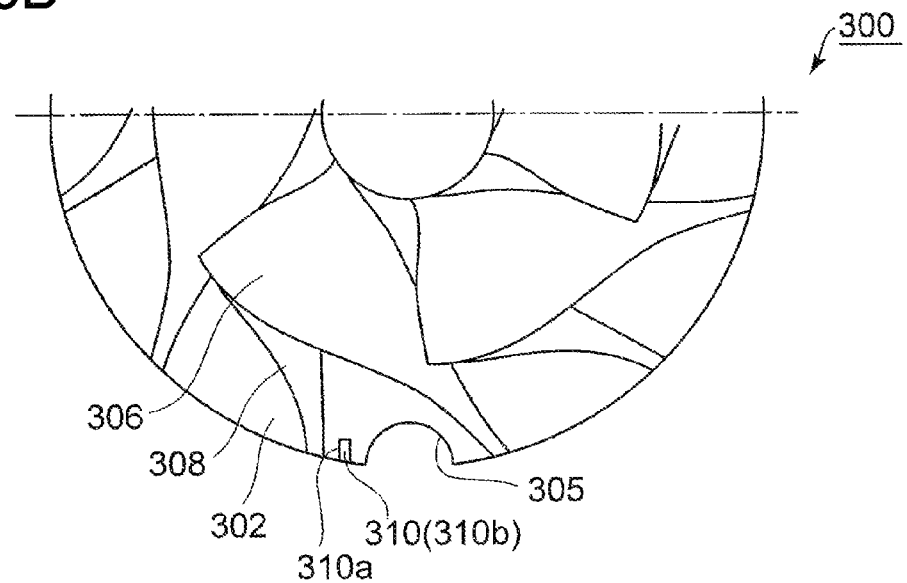

According to the present embodiment, as illustrated in FIGS. 4A and 4B, a sensor detection surface 310 is formed on a downstream side upper surface of a compressor wheel 300, namely on a circumferential surface 302a of a rear plate portion 302. Specifically, as illustrated in FIGS. 5A and 5B, in a region Z where compressor blades 306 and 308 of the compressor wheel 300 are not disposed, a cut portion 310a is formed on a vertex side of the circumferential surface 302a of a region Y excluding a region X where a balance cut portion 305 is formed so that the cut portion 310a is inclined to the circumferential surface 302a. A slope surface 310b of the cut portion 310a becomes the sensor detection surface 310. In other words, according to the present embodiment, the sensor detection surface 310 is vertically inclined to the circumferential surface 302a of the rear plate portion 302. Since the other structural elements of the compressor wheel 300 according to the present embodiment are the same as those according to the first embodiment, their description will be omitted.

To maintain the rigidity of the compressor wheel 300, the sensor detection surface 310 is desirably as small as possible. The sensor detection surface 310 has a width enough to allow an optical sensor 30 to detect the sensor detection surface 310, for example approximately 0.5 mm to approximately 1.5 mm, desirably approximately 1 mm. The sensor detection surface 310 has an inclined angle enough to allow the optical sensor 30 to distinguish and detect the sensor detection surface 310 from the circumferential surface 302 of the rear plate portion 302, for example approximately 30° to approximately 60°, desirably approximately 45°.

The optical sensor 30 detects the sensor detection surface 310 with reflected light L2 of irradiation light L1 with which the optical sensor 30 irradiates the sensor detection surface 310. As illustrated in FIG. 4B, the optical sensor 30 is vertically inclined by approximately 45° to the circumferential surface 302a of the rear plate portion 302. In other words, the optical sensor 30 is nearly perpendicular to the sensor detection surface 310, namely the slope surface 310b of the cut portion 310a. In addition, the optical sensor 30 is inclined by approximately 45° to the circumferential surface 302a and the rear surface 302b of the rear plate portion 302 of the compressor wheel 300.

As a result, the irradiation light L1 of the optical sensor 30 is regularly reflected on the sensor detection surface 310. The reflected light L2 enters the optical sensor 30. In other words, the optical sensor 30 detects the sensor detection surface 310 with the reflected light L2 of the irradiation light L1 with which the optical sensor 30 irradiates the sensor detection surface 310. On the other hand, when a region where the sensor detection surface 310 is not formed on the circumferential surface 302 of the rear plate portion 302 is irradiated with the irradiation light L1, since the irradiation light L1 is reflected at approximately 45° from this region, the reflected light L2 does not enter the optical sensor 30.

Thus, according to the present embodiment, the cut portion 310a is formed on the circumferential surface 302a of the rear plate portion 302 so that the cut portion 310a is inclined to the circumferential surface 302a. As a result, when the rotational unbalance of the compressor wheel 300 is detected and corrected, the optical sensor 30 detects the reflected light L2 only when the sensor detection surface 310 of the compressor wheel 300 passes through the front of the optical sensor 30. Consequently, when the rotational unbalance of a compressor assembly 50 (refer to FIG. 8) on which the compressor wheel 300 is disposed is corrected, the sensor detection surface 310 that becomes the reference direction and position in which a rotational unbalance position and a rotational unbalance amount of the compressor wheel 300 are contactlessly measured can be accurately detected. In addition, according to the present embodiment, since the cut portion 310a is formed on the circumferential surface 302a of the rear plate portion 302 that does not interfere with the compressor blades 306 and 308, the sensor detection surface 310 can be easily machined.

(Fourth Embodiment)

Figure 6A:
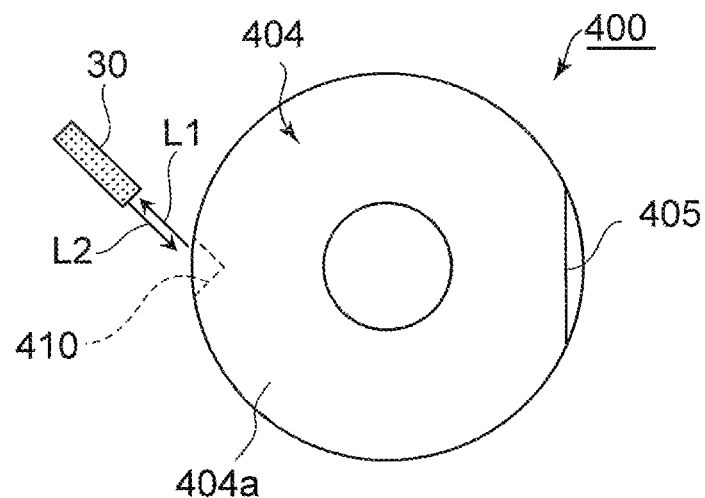
FIGS. 6A and 6B are schematic diagrams describing a structure of a sensor detection surface of a compressor wheel according to a fourth embodiment of the present invention and a detection operation that an optical sensor detects the sensor detection surface.
Figure 6B:
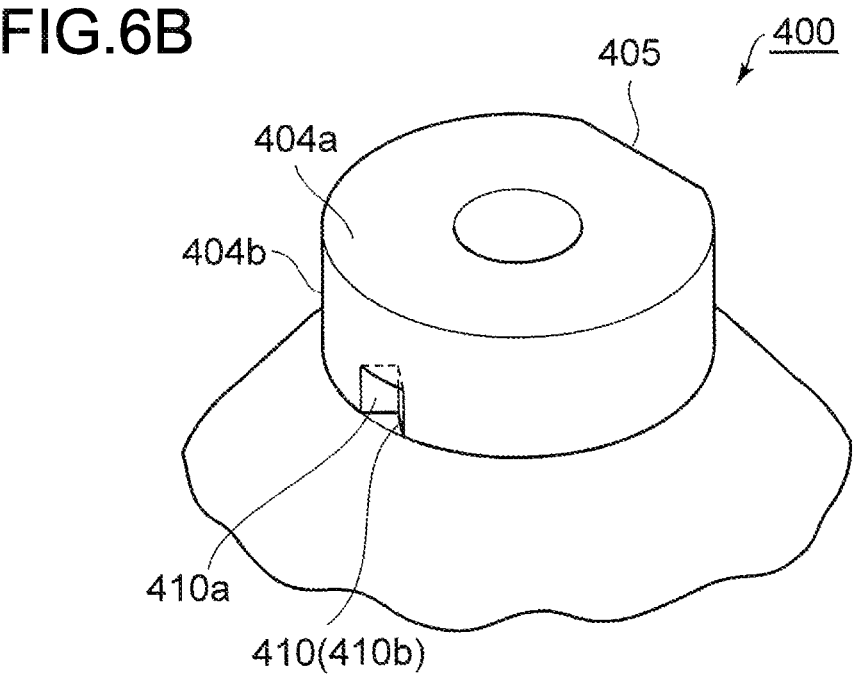

Next, with reference to accompanying drawings, a compressor wheel according to a fourth embodiment of the present invention will be described. FIGS. 6A and 6B are schematic diagrams describing a structure of a sensor detection surface of the compressor wheel according to the fourth embodiment of the present invention and a detection operation that an optical sensor detects the sensor detection surface.

According to the present embodiment, a sensor detection surface 410 is formed on a circumferential surface 404b of a tip end portion 404 of a boss portion 404 so that the sensor detection surface 410 is inclined to the circumferential surface 404b. As illustrated in FIG. 6A, a slope surface 410b of a cut portion 410a is horizontally inclined to the circumferential surface 404b of the boss portion 404. The slope surface 410b becomes the sensor detection surface 410. In other words, according to the present embodiment, the sensor detection surface 410 is horizontally inclined to the circumferential surface 404b. Since the other structural elements of the compressor wheel 400 according to the present embodiment are the same as those according to the first embodiment, their description will be omitted.

To maintain the rigidity of the compressor wheel 400, the sensor detection surface 410 is desirably as small as possible. The sensor detection surface 410 has a width enough to allow an optical sensor 30 to detect the sensor detection surface 410, for example approximately 0.5 mm to approximately 1.5 mm, desirably approximately 1 mm. The sensor detection surface 410 has an inclined angle enough to allow the optical sensor 30 to distinguish and detect the sensor detection surface 410 from the circumferential surface 404b of the tip end portion 404a of the boss portion 404 and a balance cut portion 405 that is shaved and machined to correct the rotational unbalance of the compressor wheel 400, for example approximately 30° to approximately 60°, desirably approximately 45°.

The optical sensor 30 detects the sensor detection surface 410 with reflected light L2 of irradiation light L1 with which the optical sensor 30 irradiates the sensor detection surface 410. The optical sensor 30 is a fiber sensor or the like that coaxially exits and enters light. As illustrated in FIG. 6A, the optical sensor 30 is horizontally inclined by approximately 45° to the boss portion 404. In other words, the optical sensor 30 is nearly perpendicular to the sensor detection surface 100, namely the slope surface 410b of the cut portion 410a.

As a result, the irradiation light L1 of the optical sensor 30 is regularly reflected on the sensor detection surface 410. The reflected light L2 enters the optical sensor 30. In other words, the optical sensor 30 detects the sensor detection surface 410 with the reflected light L2 of the irradiation light L1 with which the optical sensor 30 irradiates the sensor detection surface 410. On the other hand, when a region where the sensor detection surface 410 is not formed on the circumferential surface 404b of the boss portion 404 is irradiated with the irradiation light L1, since the irradiation light L1 is reflected at approximately 45° from this region of the circumferential surface 404b, the reflected light L2 does not enter the optical sensor 30.

Thus, according to the present embodiment, the cut portion 410a is formed in the tip end portion 404b of the boss portion 404 so that the cut portion 410a is inclined to the circumferential surface 404b. As a result, when the rotational unbalance of the compressor wheel 400 is detected and corrected, the optical sensor 30 detects the reflected light L2 only when the sensor detection surface 410 of the compressor wheel 400 passes through the front of the optical sensor 30. Consequently, when the rotational unbalance of a compressor assembly 50 (refer to FIG. 8) on which the compressor wheel 400 is disposed is corrected, the sensor detection surface 410 that becomes the reference direction and position in which a rotational unbalance position and a rotational unbalance amount of the compressor wheel 400 are contactlessly measured can be accurately detected.

(Fifth Embodiment)

Figure 7A:
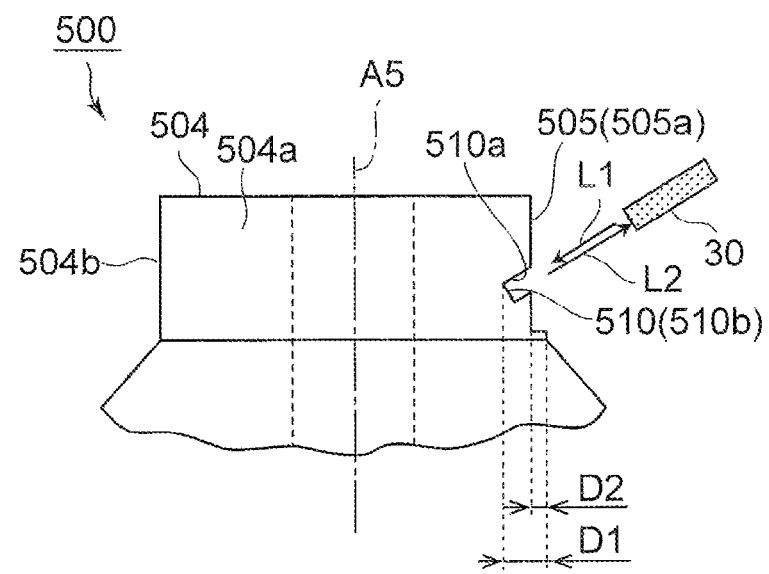
FIGS. 7A and 7B are schematic diagrams describing a structure of a sensor detection surface of a compressor wheel according to a fifth embodiment of the present invention and a detection operation that an optical sensor detects the sensor detection surface.
Figure 7B:
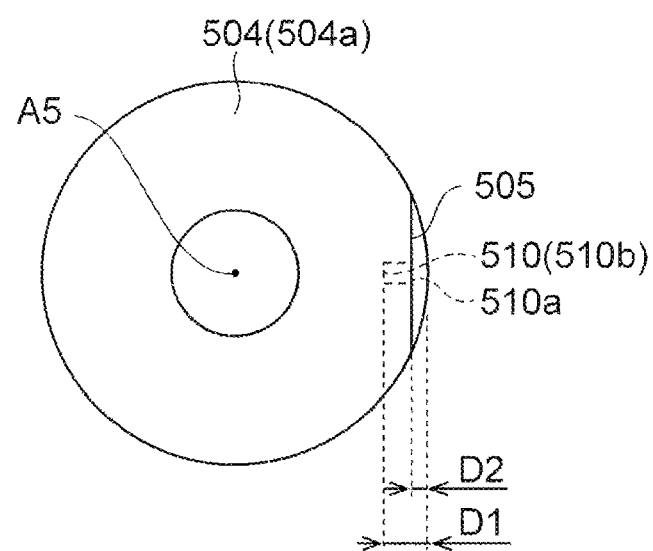

Next, with reference to accompanying drawings, a compressor wheel according to a fifth embodiment of the present invention will be described. FIGS. 7A and 7B are schematic diagrams describing a structure of a sensor detection surface of the compressor wheel according to the fifth embodiment of the present invention and a detection operation that an optical sensor detects the sensor detection surface.

According to the present embodiment, a sensor detection surface 510 is formed on a balance cut portion 505 of a tip end portion 504a of a boss portion 504. As illustrated in FIG. 7A, a bottom surface 510b of a hole portion 510a is formed in a balance cut portion 505 of a boss portion 504 so that the bottom surface 510b is inclined to the circumferential surface 504b of the balance cut portion 505. The bottom surface 510b becomes the sensor detection surface 510. In other words, according to the present embodiment, the sensor detection surface 510 is vertically inclined to the circumferential surface 504b. Since the other structural elements of the compressor wheel 500 according to the present embodiment are the same as those according to the first embodiment, their description will be omitted.

To maintain the rigidity of the compressor wheel 500, the sensor detection surface 510 is desirably as small as possible. The sensor detection surface 510 has a width enough to allow an optical sensor 30 to detect the sensor detection surface 510, for example approximately 0.5 mm to approximately 1.5 mm, desirably approximately 1 mm. The sensor detection surface 510 has an inclined angle enough to allow the optical sensor 30 to distinguish and detect the sensor detection surface 510 from the circumferential surface 504b of the tip end portion 504a of the boss portion 504 and the balance cut portion 505 that is shaved and machined to correct the rotational unbalance of the compressor wheel 500, for example approximately 30° to approximately 60°, desirably approximately 45°.

The optical sensor 30 detects the sensor detection surface 510 with reflected light L2 of irradiation light L1 with which the optical sensor 30 irradiates the sensor detection surface 510. The optical sensor 30 is a fiber sensor or the like that coaxially exits and enters light. As illustrated in FIG. 7A, the optical sensor 30 is vertically inclined by approximately 45° to the boss portion 504. In other words, the optical sensor 30 is nearly perpendicular to the sensor detection surface 500, namely the bottom surface 510b of the hole portion 510a.

As a result, the irradiation light L1 of the optical sensor 30 is regularly reflected on the sensor detection surface 510. The reflected light L2 enters the optical sensor 30. In other words, the optical sensor 30 detects the sensor detection surface 510 with the reflected light L2 of the irradiation light L1 with which the optical sensor 30 irradiates the sensor detection surface 510. On the other hand, when a region where the sensor detection surface 510 is not formed on the circumferential surface 504b of the boss portion 504 is irradiated with the irradiation light L1, since the irradiation light L1 is reflected at approximately 45° from this region of the circumferential surface 504b, the reflected light L2 does not enter the optical sensor 30.

According to the present embodiment, the hole portion 510a is inclined to the circumferential surface 504b of the tip end portion 504a of the boss portion 504. Thus, when the rotational unbalance of the compressor assembly 50 (refer to FIG. 8) on which the compressor wheel 500 is disposed is detected and corrected, the optical sensor 30 detects the reflected light L2 only when the sensor detection surface 510 of the compressor wheel 500 passes through the front of the optical sensor 30. As a result, when the rotational unbalance of the compressor assembly 50 is detected and corrected, the sensor detection surface 510 that becomes reference direction and position in which a rotational unbalance position and a rotational unbalance amount of the compressor wheel 500 are contactlessly measured can be accurately detected.

In addition, according to the present embodiment, the bottom surface 510b of the hole portion 510a is closer to a rotation axis A5 side of the compressor wheel 500 than a maximum cut range of the balance cut portion 505. In other words, as illustrated in FIG. 7A, since a depth D1 of the hole portion 510a in which the sensor detection surface 510 is formed is greater than a depth D2 of the balance cut portion 505, the sensor detection surface 510 can be formed in the balance cut portion 510 so that the sensor detection surface 510 overlaps with the balance cut portion 510. Thus, since a length of the tip end portion 504a of the boss portion 504 of the compressor wheel 500 according to the present embodiment becomes shorter than that of the compressor wheel according to each of the first to fourth embodiments, the compressor wheel 500 can be compacted.

As described above, the compressor wheel according to each of the embodiments of the present invention has a sensor detection surface at any portion other than its rear surface as a mark not necessary to be removed after the rotational unbalance of the compressor wheel is corrected. Since reference direction and position are detected based on the sensor detection surface, after a cartridge type compressor assembly is assembled, when the rotational unbalance of the compressor assembly is detected, the sensor detection surface as the reference detection portion is not hidden. As a result, after the compressor assembly is assembled, the rotational unbalance of the compressor assembly can be easily detected. In addition, since the sensor detection surface can be easily formed on the compressor wheel in advance, after the compressor assembly is assembled, the rotation unbalance of the compressor assembly can be detected without need to use a new tool such as a magnetized nut. Thus, the process for detecting the rotational unbalance of the compressor assembly can be shortened.

(Structure of Compressor Assembly)

Figure 8:
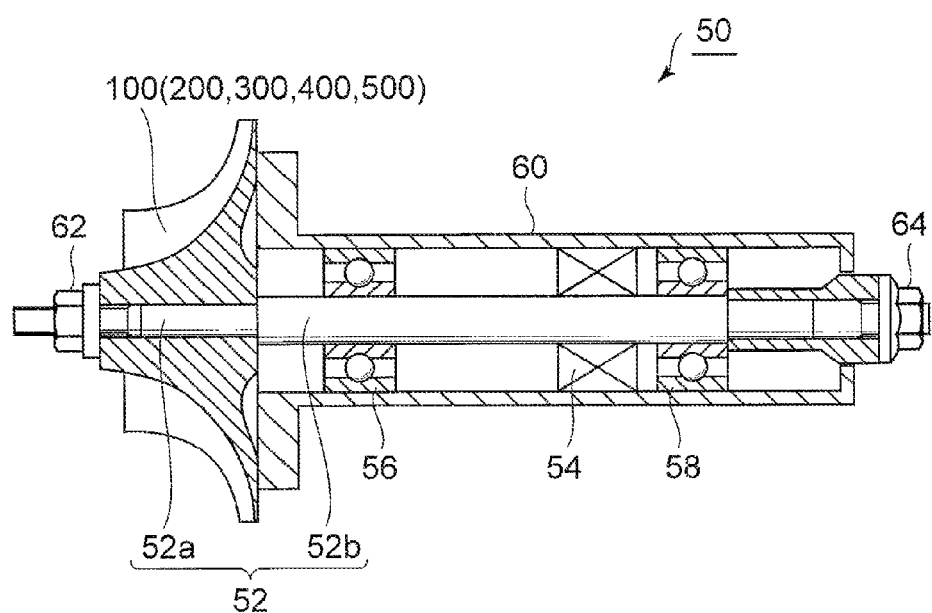
FIG. 8 is a schematic diagram illustrating an outlined structure of a compressor assembly on which a compressor wheel according to each of the embodiments of the present invention is disposed.

Next, with reference to an accompanying drawing, a structure of a compressor assembly on which a compressor wheel according to each of the embodiments of the present invention is disposed will be described. FIG. 8 is a schematic diagram illustrating an outlined structure of a compressor assembly on which a compressor wheel according to each of the embodiments of the present invention is disposed.

The compressor assembly 50 includes a rotation shaft 52, a rotor core 54 mounted on one end side of the rotation shaft 52, a compressor wheel 100 (200, 300, 400, 500) according to each of the embodiments, the compressor wheel being mounted on another end side of the rotation shaft 52, and bearings 56, 58 that support the rotation shaft 52. The rotation shaft 52, the rotor core 54, and the bearings 56 and 58 are enclosed in a casing 60, a part of the rotation shaft 52 on which the compressor wheel 100 (200, 300, 400, 500) is disposed being exposed to the outside. Both end portions of the rotation shaft 52 extending from both end sides of the compressor assembly 50 are tightened by nuts 62 and 64.

The rotation shaft 52 is composed of a thick shaft portion 52b formed at a middle portion and in an axial direction of the compressor assembly 50 and a thin shaft portion 52a formed on one end side of the compressor assembly 50 and enclosed by the compressor wheel 100 (200, 300, 400, 500). Thus, a coupling portion of the thick shaft portion 52b and the thin shaft portion 52a is stepped so that when the compressor wheel 100 (200, 300, 400, 500) is mounted on the compressor assembly 50, the coupling portion functions as a stopper in the axial direction of the compressor assembly 50. The nuts 62 and 64 are mounted on both end sides of the rotation shaft 52. After the compressor assembly 50 is assembled, the nuts 62 and 64 are used to adjust the rotational balance of the compressor assembly 50.

According to the present embodiment, the bearings 56 and 58 may be ball bearings (angular contact ball bearings) or metal bearings (slide bearings), but not limited thereto. Moreover, according to the present embodiment, as illustrated in FIG. 8, the bearings 56 and 58 are secured to both sides of the rotor core 54 disposed on the rotation shaft 52. Alternatively, the rotor core 54 and the bearings 56 and 58 may be disposed at other positions not illustrated in FIG. 8.

(Rotational Unbalance Detection Device for Compressor Assembly)

Figure 9:
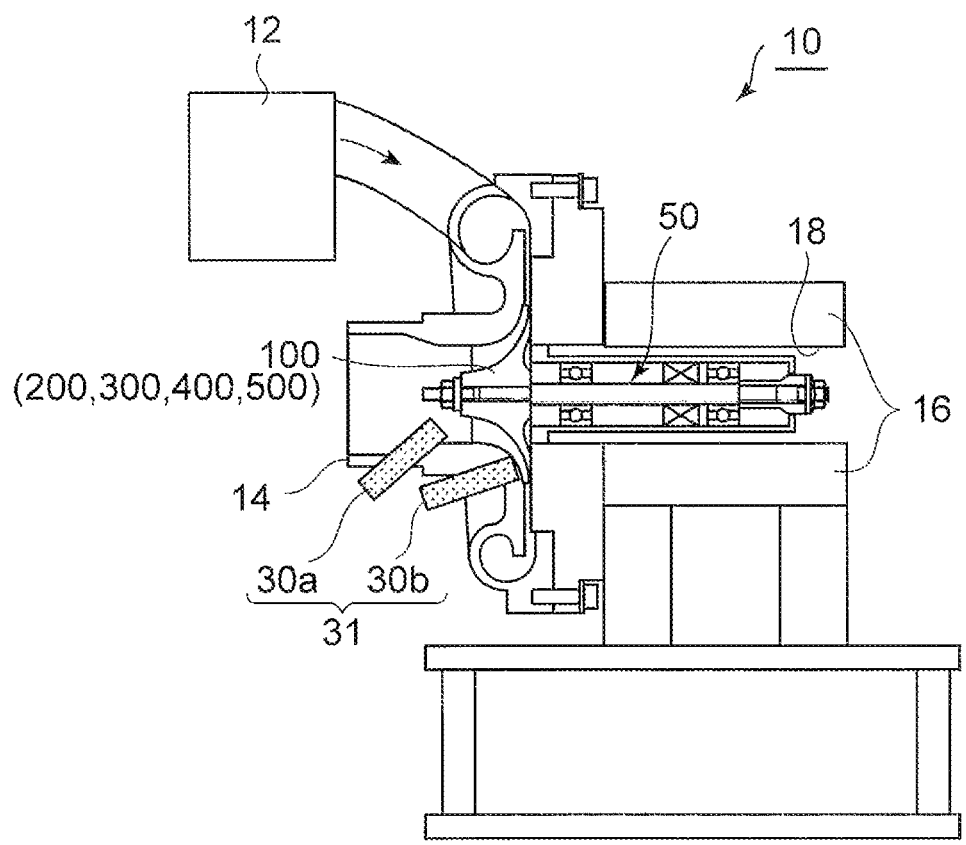
FIG. 9 is a schematic diagram illustrating an outlined structure of a rotational unbalance detection device for a compressor assembly according to an embodiment of the present invention, a compressor wheel according to each of the embodiments of the present invention being disposed on the compressor assembly.

Next, with reference to an accompanying drawing, a rotational unbalance detection device for a compressor assembly on which a compressor wheel according to each of the embodiments of the present invention is mounted will be described. FIG. 9 is a schematic diagram illustrating an outlined structure of a rotational unbalance detection device for a compressor assembly according to an embodiment of the present invention, a compressor wheel according to each of the embodiments of the present invention being disposed on the compressor assembly.

In a rotational unbalance detection device 10, an optical sensor 30a or 30b detects a sensor detection surface formed on a compressor wheel 100 (200, 300, 400, 500) disposed on the compressor assembly 50. The rotational unbalance detection device 10 measures a rotational unbalance position and a rotational unbalance amount of the compressor wheel 100 (200, 300, 400, 500) based on the sensor detection surface.

According to the present embodiment, as illustrated in FIG. 9, the rotational unbalance detection device 10 includes an air supply unit 12, a compressor cover 14 that intakes air, a detection portion 31 provided with the optical sensor 30a or 30b, a retainer 16 that retains the compressor assembly 50, an acceleration detector (not illustrated), a vector filter (not illustrated) connected to the optical sensor 30a or 30b and the acceleration detector, an A/D converter (not shown) connected to the vector filter, and a computer (not illustrated) connected to the A/D converter.

According to the present embodiment, an open portion 18 is formed on another end portion of the compressor assembly 50, the other end portion being opposite to one end portion thereof on which the compressor wheel is disposed. Thus, when the rotational unbalance of the compressor assembly 50 is corrected, the nut 64 or the like (refer to FIG. 8) can be shaved from the rear end side of the compressor assembly 50. Since the open portion 18 is formed on the rear end side of the compressor assembly 50, not only the nut 62 disposed on the front end side of the compressor assembly 50, but the nut 64 disposed on the rear end side can be shaved. As a result, the rotational unbalance of the compressor assembly can be more appropriately adjusted than the other structures.

The air supply unit 12 functions as a rotation portion that supplies air to compressor blades of the compressor wheel 100 (200, 300, 400, 500) through the compressor cover 14 and rotates the compressor wheel. When the compressor wheel is rotated by the air supply unit 12, the rotational unbalance of the compressor assembly from which a motor and an inverter are disconnected can be easily corrected. Thus, the rotational unbalance detection device 10 can be simplified and compacted.

When the number of rotations of the compressor wheel needs to be quickly increased, the air supply unit 12 desirably supplies air from the downstream side of the compressor wheel 100 (200, 300, 400, 500) to the upstream side thereof so as to effectively direct supplied air to the compressor wheel.

When the rotational unbalance of the compressor wheel needs to be accurately measured, the air supply unit 12 desirably supplies air from the upstream side of the compressor wheel 100 (200, 300, 400, 500) to the downstream side thereof so as to equally and radially direct energy of supplied air to the compressor wheel.

The detection portion 31 is provided with the optical sensor 30a or 30b that detects the sensor detection surface formed on the compressor wheel 100 (200, 300, 400, 500). When the sensor detection surface of the compressor wheel is formed on the tip end portion side of the boss portion, the first optical sensor 30a that can irradiate the tip end portion side of the boss portion with light is used. In contrast, when the sensor detection surface of the compressor wheel is formed on the vertex side of the circumferential surface of the rear plate portion, the second optical sensor 30b that can irradiate the vertex side of the circumferential surface of the rear plate portion with light is used.

In the rotational unbalance detection device 10 having the foregoing structure, when the compressor wheel 100 (200, 300, 400, 500) is rotated and is irradiated by the optical sensor 30a or 30b, detection signals are input from the optical sensor 30a or 30b and the acceleration detector to the computer through the vector filter and the A/D converter. The computer calculates vibration characteristics, calibration, and balance, statistically processes these data, and records them. Thereafter, the rotational unbalance detection device 10 measures rotational unbalance angles and rotational unbalance amounts of the compressor wheel 100 (200, 300, 400, 500) based on the sensor detection surface 110 as 0 point using vector calculations and vector decompositions.

Figure 10:
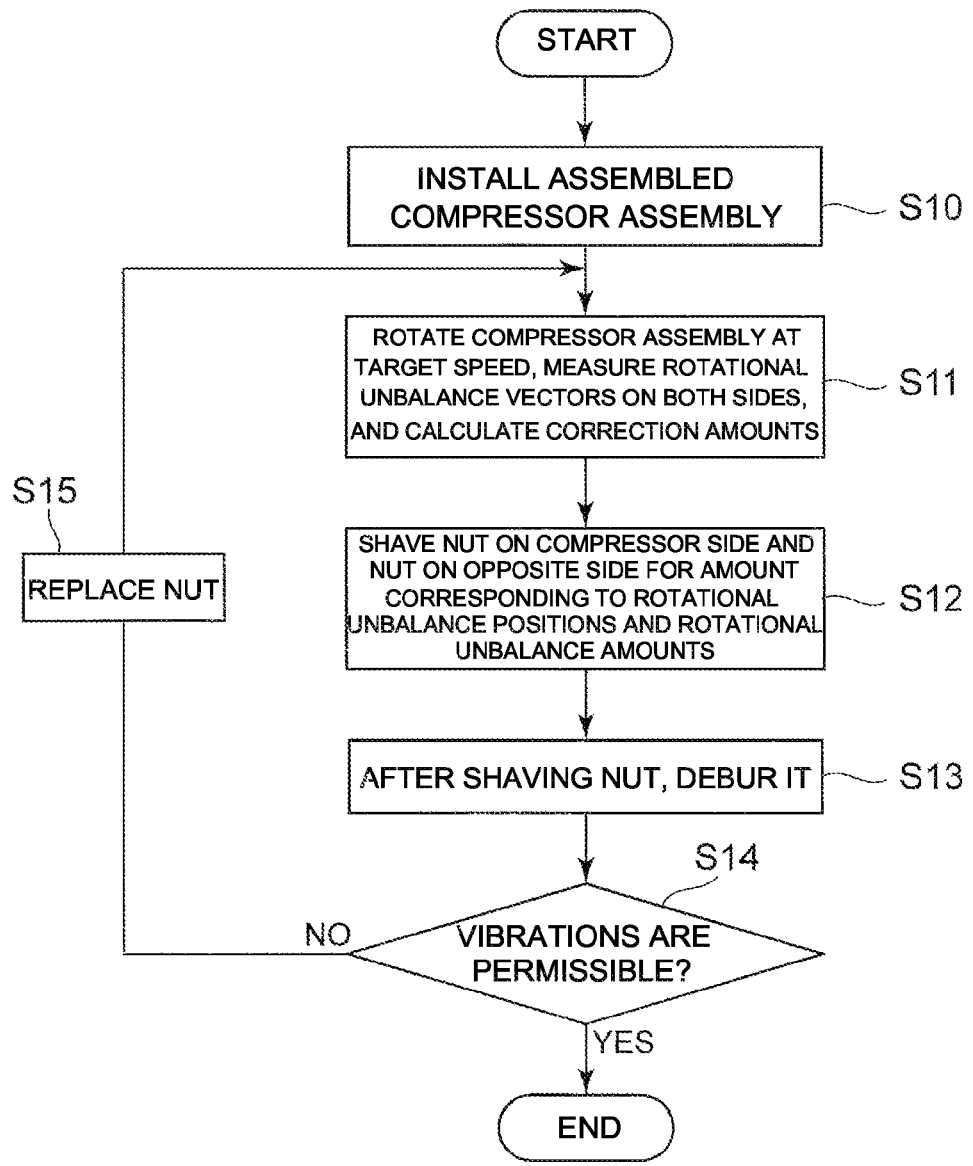
FIG. 10 is a flow chart describing a balance correction operation of a rotational unbalance detection device for a compressor assembly according to the embodiment of the present invention performs.

Next, with reference to an accompanying drawing, a rotational unbalance correction operation using the rotational unbalance detection device for the compressor assembly according to the present embodiment will be described. FIG. 10 is a flow chart describing the rotational unbalance correction operation of the rotational unbalance detection device for the compressor assembly according to the present embodiment.

First, an assembled compressor assembly is mounted on a rotational unbalance detection device (in step S10). Thereafter, a compressor wheel is rotated at a target rotation speed. Thereafter, rotational unbalance vectors on both sides of the compressor wheel are measured so as to calculate rotational unbalance correction amounts (in step S11). According to the present embodiment, the compressor wheel is rotated by compressed air supplied from an air supply unit. Rotational unbalance positions and rotational unbalance amounts of the compressor wheel are calculated based on the detection result of an optical sensor.

Thereafter, a nut disposed on one end side of the compressor wheel or a nut disposed on another side of the compressor wheel is shaved by a shaving unit or the like for an amount necessary to correct the rotational unbalance of the compressor wheel based on the calculated rotational unbalance positions and rotational unbalance amounts (in step S12). After the nut has been shaved for the calculated amount, the nut is debured (in step S13). Thereafter, it is determined whether or not vibrations generated in the rotating compressor wheel are acceptable (in step S14). When the vibrations generated in the rotating compressor wheel are acceptable, the rotational unbalance correction operation for the compressor assembly on which the compressor wheel is disposed is completed. In contrast, when the vibrations generated in the rotating compressor wheel are not acceptable, the nut that has been shaved is replaced with a good one (in step S15). Thereafter, the operation is repeated from step S1.

According to the present embodiment, when a compressor wheel according to each of the foregoing embodiments is applied to a compressor assembly, the reference direction and position based on which the rotational unbalance of the compressor assembly is measured can be accurately detected. When the rotational unbalance of the compressor assembly is detected, since the compressor wheel is rotated by an air supply unit, the rotational unbalance of the compressor assembly from which the motor of the electric compressor and the inverter are disconnected can be easily corrected. As a result, the rotational unbalance detection device can be simplified and compacted.

Figure 11:
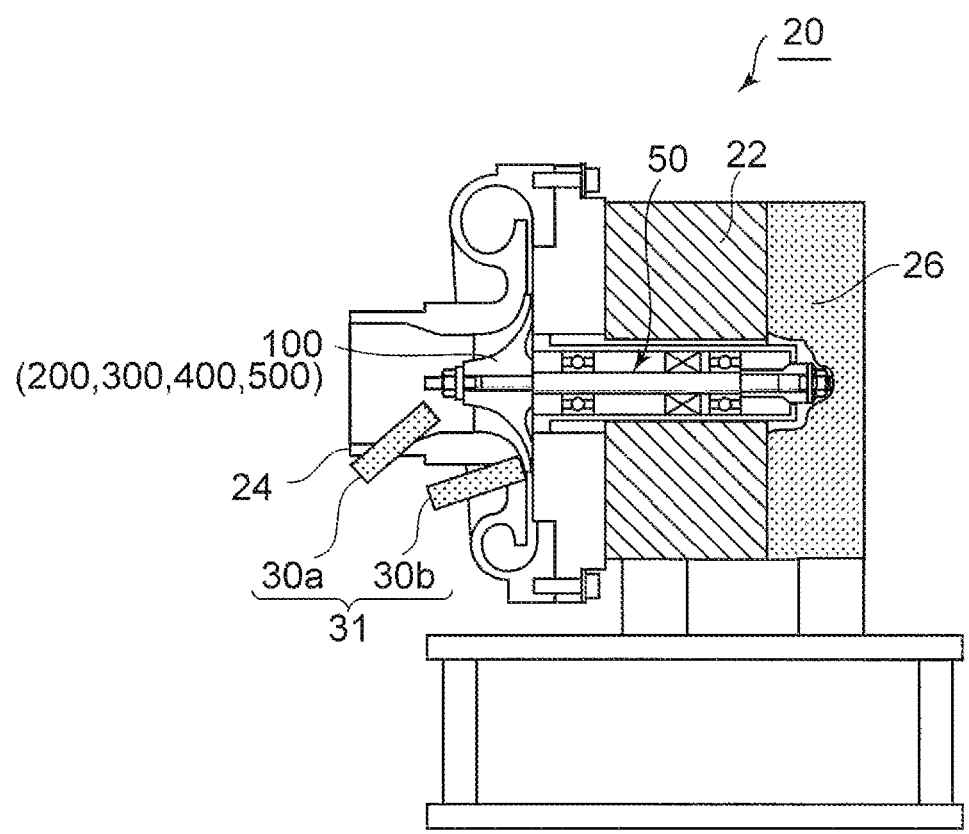
FIG. 11 is a schematic diagram illustrating an outlined structure of a rotational unbalance detection device of a compressor assembly according to another embodiment of the present invention, a compressor wheel according to each of the embodiments of the present invention being disposed on the compressor assembly.

Next, with reference to an accompanying drawing, a rotational unbalance detection device for a compressor assembly on which a compressor wheel according to each of the embodiments of the present invention is disposed will be described. FIG. 11 is a schematic diagram illustrating an outlined structure of a rotational unbalance detection device according to another embodiment of the present invention.

As illustrated in FIG. 11, a rotational unbalance detection device 20 includes a detection portion 31 provided with an optical sensor 30*a* or 30*b*, a motor 22 that rotationally drives a rotation shaft mounted on a compressor assembly 50, an acceleration detector (not illustrated), a vector filter (not illustrated) connected to the optical sensor 30*a* or 30*b* and the acceleration detector, an A/D converter (not illustrated) connected to the vector filter, and a computer (not illustrated) connected to the A/D converter. In other words, according to the present embodiment, the motor 22 functions as a rotation portion that rotates the compressor wheel 100 (200, 300, 400, 500) of the compressor assembly 50.

Like the foregoing embodiment, the detection portion 31 is provided with the optical sensor 30*a* or 30*b* that detects a sensor detection surface of the compressor wheel 100 (200, 300, 400, 500). When the sensor detection surface of the compressor wheel is formed on a tip end portion side of a boss portion, the first optical sensor 30*a* that irradiates the tip end portion side with light is used. In contrast, when the sensor detection surface of the compressor wheel is formed on a vertex side of a circumferential surface of a rear plate portion, the second optical sensor 30*b* that irradiates the vertex side of the circumferential surface of the rear panel portion with light is used.

According to the present embodiment, as illustrated in FIG. 11, the periphery of the compressor wheel 100 (200, 300, 400, 500) is surrounded by a compressor cover 24 provided with the optical sensor 30*a* or 30*b*. Alternatively, only an optical sensor may be approached to the compressor wheel that is not covered with the compressor cover 24. When the rotational unbalance of the compressor wheel needs to be corrected in a more final product state, the compressor wheel is desirably covered with the compressor cover 24. In contrast, when the rotational unbalance of the compressor wheel needs to be measured in a shorter period, it is desirable not to cover the compressor wheel with the compressor cover 24 so as to decrease the number of mounting steps.

Since the other structural elements of the rotational unbalance detection device 20 are the same as those of the rotational unbalance detection device 10 according to the foregoing embodiment, their description will be omitted. In addition, since the outlined operation flow of the rotational unbalance correction operation of the rotational unbalance detection device is the same as that according to the foregoing embodiment, the description will be omitted.

According to the present embodiment, the rotation shaft mounted on the compressor assembly is rotationally driven with a current that flows in the motor 22. Thus, the rotational unbalance of the compressor wheel can be corrected by magnetic attraction of the motor. As a result, the quality of the final product can be improved. In addition, with a current that flows in the motor 22, the discharge pressure, electricity conduction, responsiveness, and so forth can be measured along with the rotational unbalance. Thus, while the rotational unbalance is measured, the final production can be verified.

Although the individual embodiments of the present invention have been described in detail, persons skilled in the art can easily understand that there are many modifications that do not substantially depart from the novelty and effects of the present invention. Thus, such modification are deemed to be covered by the present invention.

For example, a word described at least once along with a broad or synonymous word can be replaced with such a broad or synonymous word in any place of the specification and drawings. In addition, the structures and operations of the compressor wheel and the rotational unbalance detection device for the compressor assembly are not limited to those described in the individual embodiments of the present invention and can include various modifications.

REFERENCE SIGNS LIST 10, 20 Rotational unbalance detection devices
12 Rotation portion (air supply unit)
18 Open portion
22 Rotation portion (motor)
30 Optical sensor
31 Detection portion
50 Compressor assembly
52 Rotation shaft
100, 200, 300, 400, 500 Compressor wheels
102, 302 Rear plate portions
102a, 302a Circumferential surfaces (of rear plate portions)
104, 204, 304, 404, 505 Boss portions
104a, 204a, 404a, 504a Tip end portions
104b Circumferential surface (of tip end portion of boss portion)
105, 205, 305, 405, 505 Balance cut portions
106, 108 Blades of compressor
110, 210, 310, 410, 510 Sensor detection surfaces
110a, 510a Hole portions
110b, 510b Bottom surface
210a, 310a, 410a Cut portions
210b, 310b, 410b Slope surfaces
505a Cut surface
A5 Rotation axis
L1 Irradiation light
L2 Reflected light

The invention claimed is:

1. A compressor wheel disposed in a compressor assembly, the compressor wheel comprising:
a boss portion mounted on a rotation shaft;
a rear plate portion disposed on an opposite side of a tip end portion disposed on one end side of the boss portion, the rear plate portion extending perpendicular to an axial direction of the rotation shaft; and
   a sensor detection surface formed on one of a circumferential surface of the tip end portion of the boss portion and a circumferential surface of the rear plate portion, the sensor detection surface being inclined to the circumferential surface of the tip end portion or the circumferential surface of the rear plate portion, the sensor detection surface being detectable by an optical sensor that irradiates the sensor detection surface with light and detects light reflected therefrom,
wherein a balance cut portion is disposed on the tip end portion of the boss portion, the balance cut portion being a part of the circumferential surface that is cut, and
wherein the sensor detection surface is formed closer to the rear plate portion than a region where the balance cut portion is disposed and closer to the tip end portion than a rear surface of the rear plate portion.

2. The compressor wheel according to claim 1,
wherein the sensor detection surface is a bottom surface of a hole portion formed in the boss portion, the sensor detection surface being inclined to the circumferential surface of the boss portion.

3. The compressor wheel according to claim 1,
wherein the tip end portion includes a first tip end portion on which the balance cut portion is disposed and a second tip end portion formed on a base end side of the first tip end portion, the second tip end portion having an outer diameter greater than the first tip end portion, and
wherein the sensor detection surface is a slope surface of a cut portion formed on a vertex side of the circumferential surface of the second tip end portion, the sensor detection surface being inclined to the circumferential surface of the second tip end portion.

4. The compressor wheel according to claim 1,
wherein the sensor detection surface is a slope surface of a cut portion formed on a vertex side of the circumferential surface of the rear plate portion, the sensor detection surface being inclined to the circumferential surface of the rear plate portion.

5. The compressor wheel according to claim 4,
wherein a balance cut portion is disposed on the circumferential surface of the rear plate portion, the balance cut portion being a part of the circumferential surface that is vertically cut, and
wherein the sensor detection surface is disposed on a vertex side of the circumferential surface of the rear plate portion so that the sensor detection surface does not interfere with the balance cut portion.

6. The compressor wheel according to claim 1,
wherein the sensor detection surface is a slope surface of a cut portion formed on the circumferential surface of the boss portion, the slope surface being inclined to the circumferential surface.

7. A rotational unbalance detection device for a compressor assembly in which a compressor wheel according to claim 1 is disposed, the rotational unbalance detection device comprising:
a rotation portion configured to rotate the compressor wheel; and
a detection portion having an optical sensor that detects a sensor detection surface disposed on the compressor wheel.

8. The rotational unbalance detection device for the compressor assembly according to claim 7,
wherein the rotation portion is an air supply unit that supplies air to compressor blades disposed on the compressor wheel.

9. The rotational unbalance detection device for the compressor assembly according to claim 8,
wherein the air supply unit supplies the air from a downstream side of the compressor wheel to an upstream side thereof.

10. The rotational unbalance detection device for the compressor assembly according to claim 8,
wherein the air supply unit supplies the air from an upstream side of the compressor wheel to a downstream side thereof.

11. The rotational unbalance detection device for the compressor assembly according to claim 7,
wherein the rotation portion is a motor that rotationally drives a rotation shaft disposed in the compressor assembly.

12. The rotational unbalance detection device for the compressor assembly according to claim 7, wherein an open portion is formed on another end portion of the compressor assembly, the other end portion being opposite to one end portion thereof on which the compressor wheel is disposed.

13. A compressor wheel disposed in a compressor assembly, the compressor wheel comprising:
a boss portion mounted on a rotation shaft;
a rear plate portion disposed on an opposite side of a tip end portion disposed on one end side of the boss portion, the rear plate portion extending perpendicular to an axial direction of the rotation shaft; and a sensor detection surface formed on one of a circumferential surface of the tip end portion of the boss portion and a circumferential surface of the rear plate portion, the sensor detection surface being inclined to the circumferential surface of the tip end portion or the circumferential surface of the rear plate portion, the sensor detection surface being detectable by an optical sensor that irradiates the sensor detection surface with light and detects light reflected therefrom, wherein a balance cut portion is disposed on the tip end portion of the boss portion, the balance cut portion being a part of the circumferential surface that is vertically cut, and wherein the sensor detection surface is a bottom surface of a hole portion formed in a region where the balance cut portion is disposed, the sensor detection surface being inclined to the cut surface of the balance cut portion, the bottom surface being closer to a rotation axis side of the compressor wheel than a maximum cut range of the balance cut portion.

14. A rotational unbalance detection device for a compressor assembly in which a compressor wheel according to claim 13 is disposed, the rotational unbalance detection device comprising:

a rotation portion configured to rotate the compressor wheel; and a detection portion having an optical sensor that detects a sensor detection surface disposed on the compressor wheel.

15. A compressor wheel disposed in a compressor assembly, the compressor wheel comprising:

a boss portion mounted on a rotation shaft;

a rear plate portion disposed on an opposite side of a tip end portion disposed on one end side of the boss portion, the rear plate portion extending perpendicular to an axial direction of the rotation shaft;

a sensor detection surface formed on one of a circumferential surface of the tip end portion of the boss portion and a vertex side of a circumferential surface of the rear plate portion, the sensor detection surface being inclined to the circumferential surface of the end portion or the circumferential surface of the rear plate portion, the sensor detection surface being detectable by an optical sensor that irradiates the sensor detection surface with light and detects light reflected therefrom; and a balance cut portion disposed on one of the circumferential surface of the tip end portion of the boss portion and the circumferential surface of the rear plate portion, the balance cut portion being a part of the circumferential surface that is cut, wherein the sensor detection surface has an inclined angle enough to allow an optical sensor to distinguish and detect the sensor detection surface from the balance cut portion.

16. A rotational unbalance detection device for a compressor assembly in which a compressor wheel according to claim 15 is disposed, the rotational unbalance detection device comprising:

a rotation portion configured to rotate the compressor wheel; and a detection portion having an optical sensor that detects a sensor detection surface disposed on the compressor wheel.

* * * * *